Patented Jan. 10, 1933

1,894,239

UNITED STATES PATENT OFFICE

MAX NAUMANN AND LEO SCHLECHT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF MOLYBDENUM AND TUNGSTEN CARBONYLS

No Drawing. Application filed January 17, 1931, Serial No. 509,529, and in Germany January 20, 1930.

The present invention relates to improvements in the production of the carbonyls of molybdenum and tungsten.

In the manufacture and production of molybdenum carbonyl by the action of carbon monoxide under pressure on metallic molybdenum only small yields have hitherto been obtained, even when a molybdenum metal obtained in a special manner, as for example by the reduction of molybdenum compounds which can be reduced at low temperatures, is used as the initial material for the formation of carbonyl. Tungsten carbonyl could as a rule not be obtained at all hitherto by the action of carbon monoxide under pressure on tungsten metal.

We have now found that the preparation of molybdenum carbonyl is carried out with substantially better yields and that the said method also leads to the formation of tungsten carbonyl when substances containing molybdenum or tungsten are used which have been subjected to a reducing treatment in the presence of or in admixture with copper or its compounds, and if desired heavy metals other than molybdenum, tungsten and copper, such as iron, or their compounds. Ores and intermediate or waste products which already contain copper with or without the said heavy metals are especially suitable as initial materials for the process according to the present invention. In order to obtain good results, the amount of copper present should not be too low, for example not below 1 per cent. If, however, other heavy metals are present in addition to copper, a smaller percentage may be sufficient, for example about ½ per cent of copper.

It is advantageous to avoid sintering and carbonization as far as possible during the reducing pretreatment and also during the reaction with carbon monoxide, for example by carrying out the reduction at appropriate temperatures, for example below 500° C. or, especially in case the reduction is carried out at temperatures above 500° C. such as between 700° and 1000° C. by rapidly cooling after the reduction, by the addition of materials preventing sintering, such as alumina, magnesium sulphate or calcium oxide, or by reducing by means of carbon rich in ashes.

In cases when substances containing copper are used as additions which themselves form carbonyls, the separation of the carbonyls formed may be effected for example by fractional distillation, preferably in a current of carbon monoxide, or by crystallization, or the amounts of additional substances may be chosen so that the resulting carbonyls, when thermally decomposed, yield a mixture of metals having a certain desired composition.

The residue remaining after the treatment with carbon monoxide may for example by oxidation with air or oxygen or other oxidizing gases or by dissolution in acids, reprecipitation and subsequent reduction be employed again for the formation of carbonyl with good results, so that after repeating the process for a sufficient number of times practically the whole of the metal is converted into carbonyl. The residue remaining after the greater part of the molybdenum or tungsten has been removed and which consists mainly of the cupriferous additional substances employed may be added to fresh initial material, if desired after an appropriate treatment such as purification or conversion into readily reducible compounds. The yields of molybdenum or tungsten carbonyl obtainable according to the present invention can be further increased by allowing the carbon monoxide to act on the reduced material at temperatures above 210° C. as specifically described and claimed in the copending application for patent by Max Naumann, Ser. No. 509,530, filed January 17, 1931.

The following examples will further illustrate the nature of this invention, but the invention is not restricted to these examples.

*Example 1*

Molybdic acid is reduced by means of hydrogen at 800° C. once without additions and once with an addition of so much copper nitrate that the reduced material contains 10 per cent of copper. By the action of carbon monoxide under a pressure of 200 atmospheres at 200° C., 2 per cent of the molybdenum containing copper is converted into molybdenum carbonyl in 4 hours, while from the material free from copper no molybdenum carbonyl can be obtained.

*Example 2*

Tungstic acid is subjected together with copper nitrate to reduction with hydrogen at 800° C. and then to the action of carbon monoxide under pressure in the manner described in Example 1. Considerable amounts of tungsten carbonyl are formed whereas no carbonyl is formed from tungstic acid alone under otherwise identical conditions.

What we claim is:—

1. In the production of metal carbonyl from a material containing at least one of the metals molybdenum and tungsten, the step which comprises reducing said material in the presence of a substance comprising copper, and then acting thereon with carbon monoxide.

2. In the production of metal carbonyl from a material containing at least one of the metals molybdenum and tungsten, the step which comprises reducing said material in the presence of a substance comprising copper and another heavy metal, and then acting thereon with carbon monoxide.

3. In the production of molybdenum carbonyl, the step which comprises reducing a material containing molybdenum in the presence of a substance comprising copper, and then acting thereon with carbon monoxide 4. In the production of tungsten carbonyl, the step which comprises reducing a material containing tungsten in the presence of a substance comprising copper, and then acting thereon with carbon monoxide.

In testimony whereof we have hereunto set our hands.

MAX NAUMANN.
LEO SCHLECHT.